Dec. 15, 1953

R. P. DUBUSC 2,662,828

SCRIBABLE COATING COMPOSITION

Filed Dec. 12, 1950

INVENTOR.
Roger Pierre Dubuse
BY Kenway, Jenney, Witter
and Hildreth, Attys.

Patented Dec. 15, 1953

2,662,828

UNITED STATES PATENT OFFICE 2,662,828

SCRIBABLE COATING COMPOSITION

Roger P. Dubusc, Boulogne, France, assignor to Compagnie pour la Fabrication des Compteurs et Materiel d'Usines a Gaz, Montrouge, France, a corporation of France Application December 12, 1950, Serial No. 200,418

1 Claim. (Cl. 106—175)

Figure 1:
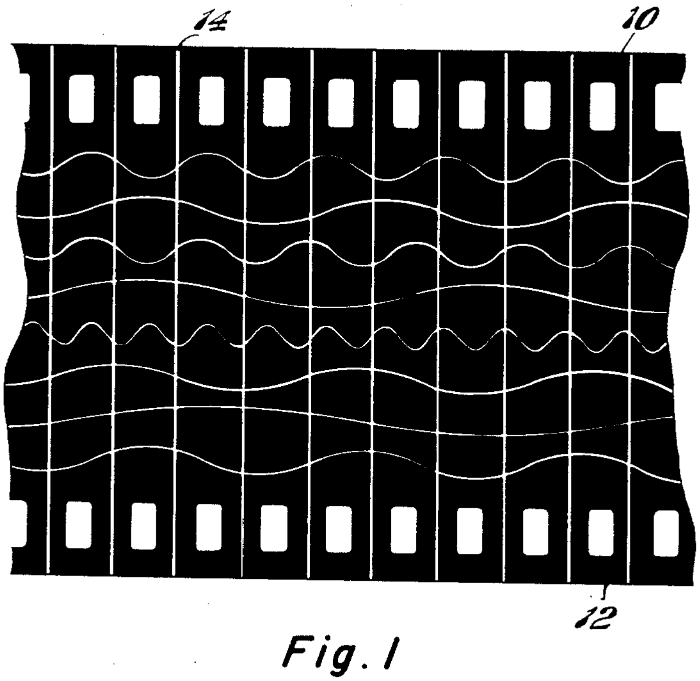

This invention consists in a novel mixture for application to the surface of a cellulosic recording medium.

In the early days of oscillographic recording, stylus recorders were almost universally employed, but in recent years they have been largely superseded by recorders employing either cathode ray tubes or deflected light beams in conjunction with a photo-sensitive recording medium. The change from stylus recorders to the types employing photographic elements was caused in part by design disadvantages in the construction of stylus oscillating mechanisms, and also in part by the fact that the recording media available for stylus recorders were inadequate. Since this invention relates to the recording media only, the phases dealing with the construction of the stylus actuating mechanisms will not be discussed, but rather emphasis will be placed upon those aspects relating solely to the recording media.

Certain stylus recorders in the past were designed to leave an ink tracing on a graph or the like: while others merely scribed a mark on a tape or disk having a smoked surface. Both of these arrangements had drawbacks. The ink type was unreliable for recording extremely fast oscillations because of the added weight at the end of the stylus and because the ink would not transfer to the graph at extremely high speeds. The type employing a stylus and smoked tape was undesirable because the graph lines on the tape were obscured by the surface layer of carbon black, and the tape required very careful handling to keep from spoiling the surface. In order to improve ease of handling, various methods were developed for spraying the surface of the smoked tape after recording, with resins and the like to fix the lamp black thereon; but nevertheless, the difficulties present in handling such tapes, the lack of graph lines thereon, and the difficulties encountered in rendering them thoroughly durable after recordation has lead the industry greatly to prefer the photographic type for the majority of oscillographic recording uses. It is to be noted that this preference for the photographic type prevails in spite of the fact that a much finer and more uniform trace is obtainable with a stylus than with a light beam or an oscilloscope.

Therefore it is an object of my invention to provide a recording medium for stylus type oscillographs which will be durable in handling, but yet which will be sensitive to the finest and lightest stylus; a recording medium which will not require mechanical or chemical fixation after recordation; which may be read immediately after recordation; and which may be freely handled without loss of clarity.

It is a further object of my invention to provide a smoked surface type recording medium having graf markings thereon.

Still another object of my invention is to provide a process for making such a recording medium.

In the accomplishing of these and other objects of my invention, I employ a conventional celluloid or cellulose acetate film on the surface of which I deposit a layer of extremely fine carbon black. The carbon black is made to adhere to the film by applying it suspended in a solution which dissolves a thin layer of the surface of the film, and has the effect of mixing part of the carbon black with the extreme surface of the film.

It is a feature of my invention that the solution employed to dissolve the surface of the film is especially blended and proportioned to avoid distortion of the film during drying.

A further feature of my invention is that the ingredients of the solution in which the carbon black is suspended perform the additional function of binding the carbon black sufficiently to ensure freedom of handling without loss of recording clarity, but yet which do not bind it so effectively that recording sensitivity is impaired.

A further feature of my invention is the addition of a plasticizing agent for improving the aging characteristics of the film.

Figure 2:
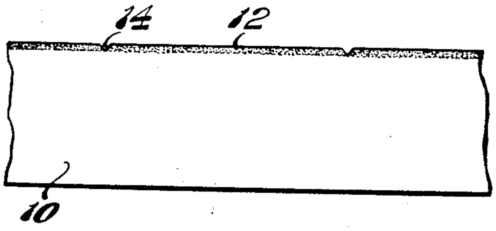

These and other objects and features of my invention will best be understood and appreciated from a detailed description of a preferred embodiment thereof, selected for purposes of illustration, and shown in the accompanying drawing in which:

Fig. 1 is an enlarged fragmentary plan view of the film of my invention, showing it employed with eight comparative traces; and Fig. 2 is a view in side elevation of a much magnified fragment of the film of my invention.

In the preferred embodiment of my invention herein shown, I employ a conventional cellulosic film 10, composed of materials such as Celluloid, or cellulose acetate, and affix thereto a thin layer 12 of extremely fine carbon black such as lamp black or extremely fine furnace black. The layer 12, although adhering to the surface of the film sufficiently to permit handling etc. under all normal conditions without disruption, may be readily scratched off by the sharp point of a stylus. The film may then be read by viewing it appropriately magnified etc. with a strong light behind it. In the preferred form herein shown, transverse graph lines 14 may be scribed by a stylus on the tape prior to recordation as an aid to comparative trace reading. Of course, longitudinal graph lines could be employed as well if desired. The film shown in Fig. 1 is a standard 35 mm. film having perforated margins adapted to engage standard drive sprockets.

The transverse graph lines 14 may be replaced by time indications scribed on the tape concurrently with the other recorded indicia, by a stylus.

With regard to the composition and application of the layer 12, numerous difficulties were encountered prior to arriving at the solution of the problem. For instance, good adhesion could be obtained by applying the carbon black suspended in acetone, but acetone caused the film to buckle during drying, and to become brittle after several months aging. On the other hand, applying the carbon black in a mixture of alcohol and ether did not cause buckling or brittleness but the adhesion was poor. Finally, the problem was solved by applying the carbon black in a mixture of alcohol and ether and adding thereto a binder composed of celluloid dissolved in acetone with a flame inhibiting plasticizer added. In this way perfect adhesion was attained and the undesirable effects of the acetone were inhibited.

The composition of the solution to be applied and permissible ranges of its constituents are as follows:

| | Preferred | Permissible |
|---|---|---|
| Carbon black ----- g. | 25 | 10-30 |
| Mixture of alcohol and ether ----- cc. | 500 | ----- |
| Binder ----- cc. | 60 | 20-100 |

The binder is made by first dissolving one part by weight of finely divided Celluloid in two parts by weight of acetone. This generally takes about ten hours. After the Celluloid is dissolved, a plasticizer and an alcohol-ether mixture are added to give the following composition and permissible variations:

| | Preferred | Permissible |
|---|---|---|
| Celluloid | 20 g. | 10-30 g. |
| Acetone | 40 g. (50 cc.) | 20-60 g. |
| Plasticizer (tricresylphosphate) | 6 g. (5 cc.) | 2-9 g. |
| Mixture of alcohol and ether | 345 cc. | ----- |

The alcohol-ether mixtures may vary from 50 to 100 cc. alcohol for each 100 cc. ether.

It will be noted that in the final surface coating, after application to the film, the ratio of carbon black to cellulosic binder is approximately 8 to 1 by weight. This feature is important in rendering the surface easily scribable.

Numerous variations of my invention will be apparent to those skilled in the art. For instance, it is not necessary that a film be employed. A transparent Celluloid or cellulose acetate plate, disk or drum could readily be substituted for the film 10. Furthermore, the invention need not be limited to carbon black. Other extremely fine pigments such as $FeO$ or $SiO_2$ could be employed instead of carbon black without departing from the spirit of the invention. Therefore it is not intended to limit the invention to the precise form above described but rather to measure it in terms of the appended claim.

Having thus disclosed and described a preferred embodiment of my invention, what I claim and desire to secure by Letters Patent of the United States is:

A mixture for application to a cellulosic surface to form thereon an opaque, scribable coating, comprising the following substances in the following proportions:

| | | |
|---|---|---|
| Carbon black ----- | g. | 25 |
| Mixture of alcohol and ether (containing ½ to ⅓ of alcohol by volume) ----- | cc. | 550 |
| Acetone ----- | g. | 6 |
| Flame inhibiting plasticizer ----- | g. | 1 |
| Celluloid ----- | g. | 3 |

ROGER P. DUBUSC.

References Cited in the file of this patent

UNITED STATES PATENTS

| Number | Name | Date |
|---|---|---|
| 680,145 | Hawley | Aug. 6, 1901 |
| 1,251,710 | Vient | Jan. 1, 1918 |
| 1,508,483 | Stevens | Sept. 16, 1924 |
| 1,523,814 | Lindsay | Jan. 20, 1925 |
| 1,950,518 | Read | Mar. 13, 1934 |
| 1,990,811 | Zimmerman | Feb. 12, 1935 |
| 1,997,857 | Charch | Apr. 16, 1935 |
| 2,021,949 | Stone | Nov. 26, 1935 |
| 2,314,244 | Pratt | Mar. 16, 1943 |

FOREIGN PATENTS

| Number | Country | Date |
|---|---|---|
| 18,550 | Great Britain | 1898 |
| 576,596 | Great Britain | Apr. 11, 1946 |